United States Patent [19]
Dalglish

[11] Patent Number: 5,086,411
[45] Date of Patent: Feb. 4, 1992

[54] OPTICAL LOCATION SYSTEMS
[75] Inventor: Robert L. Dalglish, Sydney, Australia
[73] Assignee: Unisearch Limited, Kensington, Australia
[21] Appl. No.: 384,696
[22] Filed: Jul. 25, 1989
[30] Foreign Application Priority Data
Jul. 25, 1988 [AU] Australia .............................. PI9459
[51] Int. Cl.$^5$ .......................... G06F 7/48; G11C 19/30
[52] U.S. Cl. .................................... 365/106; 365/124; 356/1; 356/2
[58] Field of Search ....................... 365/106, 124, 127; 356/375, 376, 1, 2; 382/65; 358/199

[56] References Cited
U.S. PATENT DOCUMENTS

| | | |
|---|---|---|
| 3,940,762 | 2/1976 | Ethington et al. . |
| 4,281,342 | 7/1981 | Ueda et al. . |
| 4,309,618 | 1/1982 | Carter, Jr. et al. . |
| 4,373,804 | 2/1983 | Pryor et al. . |
| 4,375,649 | 3/1983 | Mir et al. . |
| 4,396,945 | 8/1983 | DiMatteo et al. . |
| 4,419,011 | 12/1983 | Matsuda et al. . |
| 4,489,389 | 12/1984 | Beckwith et al. . |
| 4,567,347 | 1/1986 | Ito et al. ............................ 356/376 |
| 4,575,304 | 3/1986 | Nakagawa et al. . |
| 4,584,704 | 4/1986 | Ferren . |
| 4,613,942 | 9/1986 | Chen . |
| 4,615,615 | 10/1986 | Krolak et al. . |
| 4,639,878 | 1/1987 | Day et al. . |
| 4,660,157 | 4/1987 | Beckwith et al. . |
| 4,760,605 | 7/1988 | David et al. . |
| 4,774,678 | 9/1988 | David et al. . |
| 4,939,439 | 7/1990 | Dalglish ............................. 364/513 |

FOREIGN PATENT DOCUMENTS

| | | |
|---|---|---|
| 268916 | 11/1962 | Australia . |
| 2689168 | 11/1962 | Australia . |
| 273581 | 2/1964 | Australia . |
| 4068164 | 2/1964 | Australia . |
| 30771/84 | 7/1984 | Australia . |
| 29567/84 | 1/1985 | Australia . |
| 2956784 | 3/1985 | Australia . |
| 3077184 | 4/1985 | Australia . |
| WO79/00189 | 4/1979 | PCT Int'l Appl. . |

OTHER PUBLICATIONS

William B. Gevarter, "An Overview of Computer Vision", U.S. Dept. of Commerce, Nat'l Bureau of Stds., Publication Nos. NBSIR 82-2582, Sep. 1982, Appendix H. pp. 118-121.
Kreis et al., "Detection of Edges by Videosystems", pp. 9-17, Proceedings of the 2nd Int'l Conf. on Robot Vision and Sensory Controls, Stuttgart, 1982, pp. 9-17.
D. M. Connah et al., "Using a Laser for Scene Analysis", Proc. of the 2nd Int'l Conf. on Robot Vision and Sensory Controls, Suttgart, 1982, pp. 233-240.
Bogaert et al., "3D Perception in Industrial Environment", 3rd Int'l Conf. on Robot Vision and Sensory Controls, Cambridge, Mass. 1983, pp. 373-380.
Kanade et al., "An Optical Proximity Sensor for Measuring Surface Position and Orientation for Robot Manipulation", 3rd Int'l Conf. on Robot Vision and Sensory Controls, 1983, pp. 667-673.

Primary Examiner—Alyssa H. Bowler
Attorney, Agent, or Firm—Fleit, Jacobson, Cohn, Price, Holman & Stern

[57] ABSTRACT

An optical location system having a beam projection device (11, 51, 12, 13) to illuminate the field of view, and a detector array (29) to detect reflected light (21) from the field of view. The projected beam (13) is incrementably progressed across the field of view and for each increment the reflected points of light (61) detected by the detector (29) are recorded to build a map of the field of view, which is stored as a sparse array having as its first coordinate the angle of projection (A) of the illuminating beam (13) and as its second coordinate the azimuth angle (B) of the reflected ray detected by the detector. The value stored in each element of the array is the angle of the incidence (C) of the horizontal component of the detected ray with the detector.

3 Claims, 6 Drawing Sheets

OPTICAL LOCATION SYSTEMS

IMPROVEMENTS IN OPTICAL LOCATION SYSTEMS

This application relates to applicant's copending application Ser. No. 239,080, filed Sept. 1, 1988, now U.S. Pat. No. 4,939,439.

BACKGROUND OF THE INVENTION

The present invention relates to an improved object location means for robot vision and optical systems.

Applications for industrial robots are presently restricted to simple repetitive tasks on production and assembly lines where components are delivered to the robot station under tightly controlled conditions. The principle reason for their limitation to such roles is the lack of an efficient and economical general technique to provide them with vision. Considerable effort is now being made in all technologically advanced countries, to provide a suitable robot vision system. The commercial implications of a satisfactory system are very considerable and could initiate a new major industry.

Until recently the only successful attempts at industrial or robot vision systems have been restricted to very simple application systems to locate and orient components on some form of conveyor belt. This type of situation is comparatively easy to handle since the system is tightly constrained to a well regulated two dimensional object field. Nonetheless, the logic systems required by contemporary designs, even for this simple case, usually need at least a powerful minicomputer.

The present applicants have described, in their copending Australian Patent Application No. 62020/86, a system directed to the more general problem of locating and recognizing objects in full three-dimensional space, which problem had not previously been solved. All other systems known to the present inventor are highly experimental and invariably use main frame or very high powered computers; even with this power, the problem of location cannot be properly solved. Many techniques using outlines, edge detection, shading assessment, color, visual flow fields and the like, have been tried individually and in combination, to reconstruct the three dimensional aspects of an object field seen by a television camera. The inevitable complexity of these techniques defies a good real-time solution even where the most powerful computers now available are used for the analysis.

The central problem in the general three-dimension case is in the recovery of the "depth" information from the two-dimensional image collected by a conventional camera or image system. The prior art provides no general technique for unambiguous recovery of the information lost irretrievably in the 3D to 2D transformation.

BRIEF SUMMARY OF THE INVENTION

According to a first aspect, the present invention consists in an optical imaging and location system comprising:

projection means situated at a first known location and arranged to project a beam of light or other suitable radiation into a field of view in a direction subtending a variable angle A with a reference base line;

detection means spaced a predetermined distance from the projection means along said base line and including a lens and a detector array arranged so that a reflected ray of radiation from an object in the field of view is directed by said lens substantially onto one element of said array and the array having a first dimension the co-ordinate of which represents a value of an angle of incidence C between the projection of said ray in a horizontal reference plane and said base line, the value of C being determined by detecting the respective element in said first dimension of the array onto which the peak intensity point of the reflected beam is directed by the lens; and storage means for storing a spatial map of the field of view comprising a sparse array having one fewer dimension than the field of view, one dimension of the array being addressed by a value representing the angle A and each cell of the array being arranged to store the value C.

In a preferred embodiment the field of view is a three dimensional space and the sparse array is a two dimensional array one dimension of which is addressed by a value representing the angle A and the other dimension of which is addressed by a line number B corresponding to a line of elements in the first direction of the detector array, said line number being representative of an elevation angle of the reflected ray subpended with the horizontal reference plane.

In the preferred embodiment, each cell of the sparse array holds a value representative of the angle C, corresponding to the position along the line of elements defined by B and determined by locating the element onto which the peak intensity point of the reflected beam is directed by the lens in the plane defined by B, and an intensity value, being the intensity of the reflected ray for which the angle C was recorded.

According to a second aspect, the present invention consists in an optical imaging and location system comprising:

projecting means situated at a first known location and arranged to project a beam of light or other suitable radiation into a field of view in a direction subpending a variable angle A with a reference base line;

detection means spaced a predetermined distance from the projection means along the base line and including a lens and a detector array arranged so that a reflected ray of radiation from an object in the field of view is directed by the lens substantially onto one element of the array and the array having a first dimension the co-ordinate of which represents a value of an angle of incidence C between the projection of the may in a horizontal reference plane and the base line, the value of C being determined by detecting the respective element in the first dimension of the array onto which the peak intensity point of the reflected beam is directed by the lens; and wherein compensation means are provided to adjust the intensity value recorded by each element in the detector array to compensate for the variation expected in the intensity of the reflected ray for different values of the angle A and different path lengths from the projection means to the point of reflection represented by the value C.

In particular embodiments of the invention the cross-sectional profile of the projected beam might be provided with a characteristic signature which is either fixed, such as a characteristic frequency or variable such as a code corresponding to the angle of projection of the beam.

According to a third aspect the present invention consists in an optical imaging and location system comprising:

projection means situated at a first known location and arranged to project a beam of light or other suitable radiation into a field of view in a direction subpending a variable angle A with a reference base line and the beam having a predetermined cross-sectional intensity profile;

detection means spaced a predetermined distance from the projection means along the base line and including a lens and a detector array arranged so that a reflected ray of radiation from an objection in the field of view is directed by the lens substantially onto one element of the array and the array having a first dimension the co-ordinate of which represents a value of an of angle of incidence between the projection of the ray in a horizontal reference plane and the base line, the value of C being determined by detecting the respective element in the first dimension of the array onto which the peak intensity point of the reflected beam is directed by the lens;

filter means arranged to attenuate intensity profiles detected by the detector array which do not correlate with the intensity profile of the projected beam.

In a preferred embodiment the detector array is a two dimensional array of a raster scan video camera and the filter means are arranged to process the camera output, the filter having a transfer function which is the fourier transform of the average intensity profile expected for a camera scan line when the camera scans an object in said field of view which is illuminated by the projected beam.

According to a fourth aspect, the present invention consists in an optical imaging and location system comprising:

projection means situated at a first known location and arranged to project a beam of light or other suitable radiation into a field of view in a direction subtending a variable angle A with a reference base line the radiation being limited to a predetermined band of wavelengths;

detection means spaced a predetermined distance from the projection means along the base line and including a lens and a linear detector array arranged so that a reflected ray of radiation from an object in the field of view is directed by the lens substantially onto one element of the array and the array having a first dimension the co-ordinate C of which represents a value of an angle of incidence between the projection of the ray in a horizontal reference plane and the base line, the value of C being determined by detecting the respective element in the first dimension of the array onto which the peak intensity point of the reflected beam is directed by the lens; and filter means being arranged to limit the wavelength of radiation falling on the detector array to the predetermined band of the projected beam whereby light originating from other source will be attenuated.

BRIEF DESCRIPTION OF THE DRAWINGS

Embodiments of the present invention will now be described in detail with reference to the accompanying drawings wherein.

DETAILED DESCRIPTION

Figure 1:
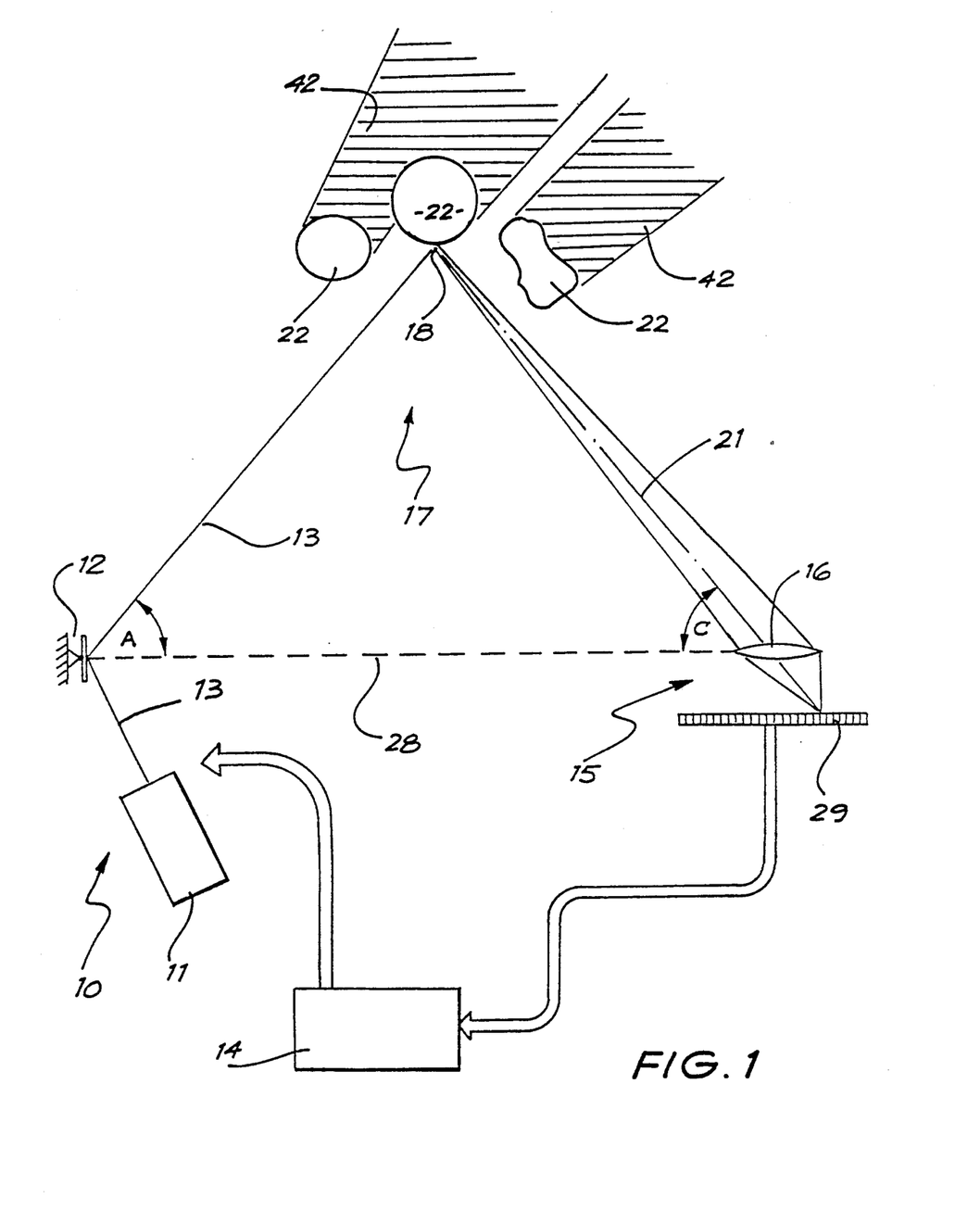
FIG. 1 schematically illustrates the basic concept relied upon in the present invention.

Referring to FIG. 1 the arrangement illustrated uses for convenience, a simple low-power laser as a light source 11. The laser beam 13 is directed to a small rotatable mirror 12 whose orientation can be controlled. This allows the laser beam to be scanned across the object field 17. In the simplified two dimensional case illustrated, the beam 13 will simply scan a point of light across the field of view, however in a three dimensional case the beam 13 would be a vertical ribbon beam and the view of FIG. 1 could be considered to be a plan view of the system.

The light detection means 15 comprises a lens system 16 to collect the laser light scattered by objects 22 in the object space and to image this light onto an array of photosensor elements 29. The detector used for this embodiment is a linear CCD (charge coupled device) comprising integrating photodetectors which can be unloaded on command. In a three dimensional system the lens 16 and sensor might be the lens and imaging element respectively of a video camera in which case the array 29 would be a two dimensional array.

The elements of the system are controlled by a control unit 14 which operates the scan mirror 12 and unloads the data stream from the light detection means 15. The control unit 14 also processes the data into a matrix defining the position of all objects 22 in the field of view 17 which reflect light 21 originating from the laser beam 13. Illumination of objects 22 is achieved by moving the mirror 12 into a known position where the beam is cast at a known angle into the field of view 17. If this beam illuminates a small fraction 18 of an object in the field of view, some of the light 21 will be scattered into the lens and will be focussed onto a small region of the detector array cells 29. The angle of the object relative to the light detection means 15 can be easily determined from the image formed on the array 29, and this angle along with the known projection angle of the light beam, allows the object's position to be fully defined in the object space. Thus, at each mirror position, the co-ordinates of any object illuminated can be directly determined and entered into a data array in the computer's memory. After several scans at different laser beam angles, a complete matrix of object co-ordinates can be assembled to any required precision.

If highly reflective objects are present, there is a chance that multiple reflections will occur. This can be handled quite easily by higher level analysis of the data matrix generated by the control unit 14.

Many potential applications of the invention require the system to operate under high levels of ambient light. This can lead to some difficulty in differentiating between the laser illumination and the background light. These situations can be handled directly either by using a laser source and a sharp bandpass filter to block all but the laser light from the detector, by the provision of a mechanical or electronic shutter to the illumination source or by using a pulsed laser, or by processing the output of the detector array in accordance with the expected spatial characteristics of the source illumination. If beam modulation is in the form of a chopped or pulsed beam, the beam is allowed to illuminate the object space for a short time at each mirror and scan beam position and the detector array output is then read and stored in the computer. The beam is then turned off and, after the same amount of time, the detector array output is again read and compared to the previous readings. The difference between these two readings will be due to the intentional illumination while the effects of ambient illumination will be cancelled. When signal processing of the detector output is used to eliminate the effects of ambient light, first the spatial distribution of the source beam is determined and then a filter is designed which will select output components which match the expected output for such a distribution and this filter is used to process the output of the detector array. In the case where the detector output is a raster scan video camera, the filter will have a transfer function which is related to the fourier transform of the intensity distribution profile through the width of the projected beam.

Referring back to FIG. 1, it can be seen that if the location of the light projection means and light detection means are known, a base line 28 of known orientation between the units can be established. A beam projected in a known direction forms an angle A relative to this base line and, in the illustrated two dimensional case, scattered light collected by the light detection means indicates the direction of the illuminated fraction 18 of the object space from the light detection means relative to the base line as being an angle C.

It is clear that the data provided will allow the location of the illuminated fraction of the object space 18 to be determined unambiguously using simple triangulation. Location systems according to the present invention record the co-ordinates of a point 18 using the native co-ordinates of the location system and in the case of point 18 the co-ordinates will be (A, C where A and C are the two angles referred to above which are subtended at the ends of the base line 28. It should also be realized that if cartesian co-ordinates are required by a particular application, these can be readily calculated from the data provided by the location system.

From the embodiment illustrated FIG. 1, it will be clear that by systematically scanning beam 13 across viewing field 17 and comparing and analyzing data at small time increments to determine the locations of parts of the viewing field thus illuminated, it is possible to quickly build up an image of objects 22 located within said field.

The information added to the field by controlling its illumination allows an extra dimension of information to be collected to that provided by the detector array used. This is to say a simple two dimensional plan or map can be provided using a one dimensional detector array and a complex three dimensional model can be developed using a two dimensional array.

The shape of objects can be reconstructed in this manner, and their identity and orientation can therefore be established. For many objects, the albedo of the surface and its change with orientation, can be used to discriminate between similar shaped objects. Since the range and orientation of the objects can be discerned unambiguously by the system, the apparent brightness of the object can be assessed and used for identification of objects or for resolution of apparent ambiguities.

Furthermore, suitable software in the control system can detect if some areas of the object space cannot be properly resolved. If the computer can control the beam's position as well as its angle, the scanning illumination beam can be limited to suitable portions of the object field to resolve any ambiguities.

Two variations on the embodiment of FIG. 1 exist. Light may be projected as a thin vertical ribbon of light or in the two dimensional case as a thin ray, and periodically swept across the object space.

As only the angles A and C relative to a known base line are required to replace depth of field information and data regarding horizontal and vertical co-ordinates can be obtained from the detector output in the three dimensional case, the location of a fraction of the object space illuminated by the ribbon source, which may comprise a series of co-ordinates, can also be unambiguously determined.

Figure 2:
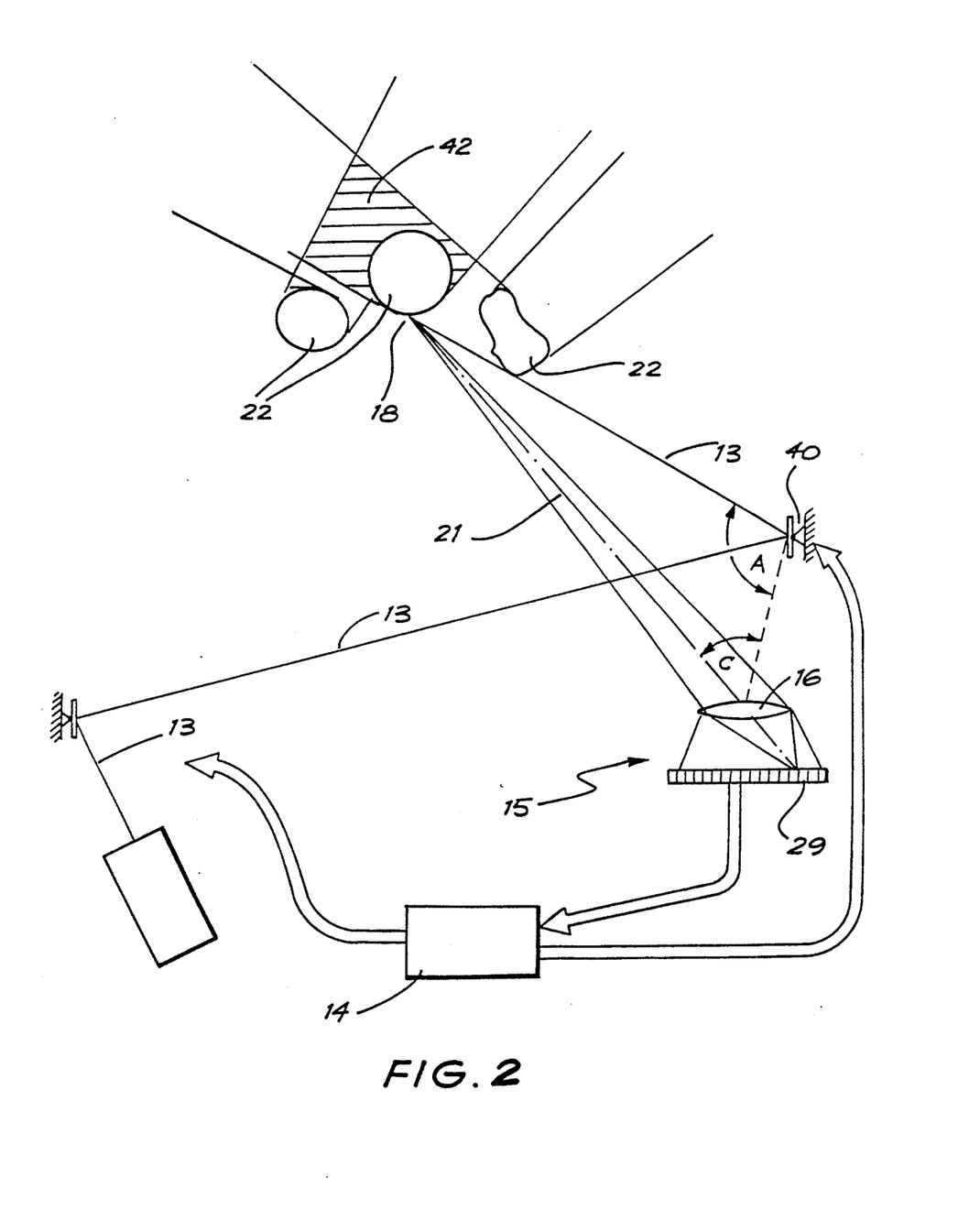
FIG. 2 schematically represents a method of resolving ambiguities by illuminating the object space from more than one direction.

Reference to FIG. 2 shows how the system depicted in FIG. 1 can be modified by projecting the illuminating light beam from more than one position. In the schematic illustration of FIG. 2 the light beam 13 is projected to a secondary steerable mirror 40 at a second known location and then scanned across the object space in the previously described manner. By combining data gained from scanning the viewing field from the second position with that gained from scanning the viewing field from the first position the unilluminated shadow region 42 is greatly reduced, giving potential for increased information about the objects in the field.

Furthermore, it should be realized that scope exists to employ a plurality of field projection means and a plurality of light detection means simultaneously.

Such combinations would allow a remote light beam source to illuminate a large area for multiple detector systems with a single swept beam. For example, a plurality of single, very sensitive high gain scanning detectors located at individual receiver locations would allow very faint signals scattered from distant objects to be detected. Such a system, with double scanning, would be fairly slow but would provide a very economical solution for long range object sensing. The provision of several illumination beams with different modulation patterns would allow a detector station to select that beam which gave the best information of the object field.

In other implementations of the imaging system of the present invention the projected beam which is scanned across the field of view in the previously described embodiment is replaced with a composite beam comprising a plurality of beam components which are simultaneously projected on each of the incremental projection directions represented by the angle A. Each of these beam components will be encoded with a temporal code signal indicative of its angle of projection A.

Figure 3:
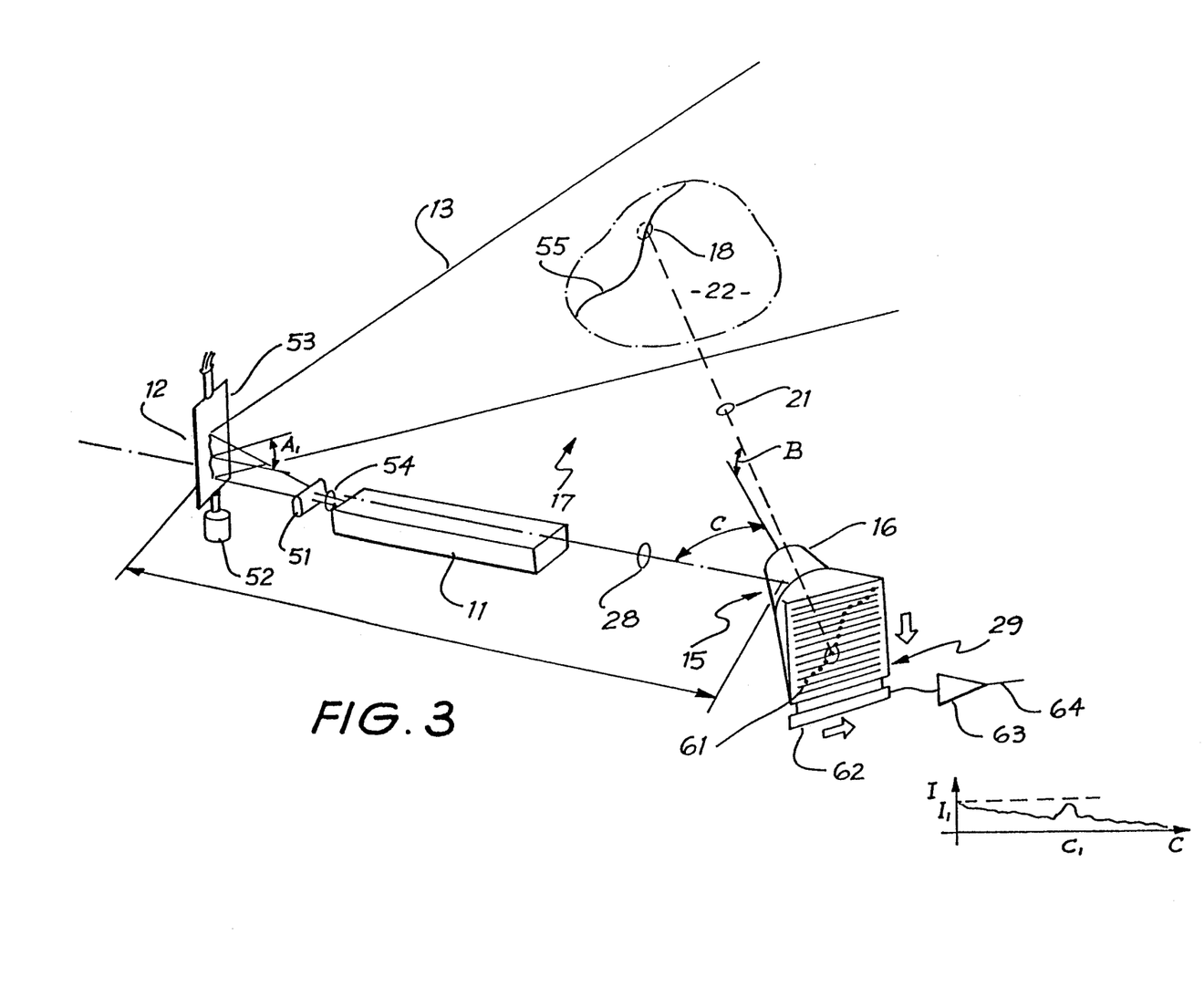
FIG. 3 schematically illustrates the physical arrangement of projection and detection elements of a preferred embodiment of the present invention.

Referring to FIG. 3, the physical arrangement of the optical components of a preferred embodiment is illustrated, comprising a video camera 15 and a scanning beam projection device 12 located at opposite ends of a reference base line 28, with a laser source 11, projecting a beam of light through a lens 51 and onto the scanning device 12 to produce a ribbon beam 13 which is scanned across the field of view 17 by rotating the mirror 53 of the scanning device 12 with the scanning motor 52. The lens 51, placed in the path of the beam 54 from the laser source 11 has the effect of converting the circular ray created by the laser source into the ribbon beam 13 required by the apparatus of the present invention. In the system of FIG. 3, the first co-ordinate of any point in the field of view 17 is the angle of projection A which is required to illuminate the particular point with the projected beam 13 and this angle A is referred to as the illumination angle.

At the other end of the base line 28, the camera 15 comprises a lens system 16 which projects detected light onto a detector array 29, which will preferably be a charge coupled device (CCD) detector array but may equally be replaced by any other suitable video imaging device. At the end of each frame period of the camera, the image signal held in the detector array 29 is shifted into an output register 62 line by line and then shifted out of the output register via an output amplifier 63 to produce an analog video output signal 64.

The beam of light projected by the laser 11 is directed by the mirror 53 into the field of view, to illuminate a vertical plane within the field of view subtending an angle A with the base line at the rotational axis of the mirror 53. By incrementally rotating the mirror 53, over a period of time, the vertical ribbon beam 13 is swept across the field of view 17 and for each incremental position of the beam, an image of the field of view is recorded by the camera 15. Referring to FIG. 3, the beam 13 is illustrated for one direction $A_1$ wherein a line of light 55 is projected onto an object 22 within the field of view and a corresponding line image will be recorded by the detector array 29 while the beam 13 is projected in the direction $A_1$. Once the frame has been recorded by the detector array 29 and shifted out of the camera, the beam 13 will be moved to its next incremental position and a new image recorded for the next value of A. For each value of A, a series of points within the field of view will be located, having a first co-ordinate A and a series of second co-ordinates $B_n$ representing an elevational angle corresponding to a particular one of the plurality of scan lines provided in the detector array 29, while the third co-ordinate C for each point is determined by the position of the respective illuminated point along its particular scan line, this position representing the azimuth angle C subtended with the base line 28 by the reflected ray 21. It will be recognized that because of the physical arrangement of the equipment, for any projection angle A and elevation angle B, there will only be one illuminated point 18 and accordingly the co-ordinates A, B, C may be conveniently stored as a sparse array comprising a two dimensional array of storage elements indexed by the A and B co-ordinates respectively with each storage element comprising two cells one of which is used to store the C co-ordinate of a point located within the field of view and the other cell being used to store the intensity (I) of the image at that point.

Figure 6A:
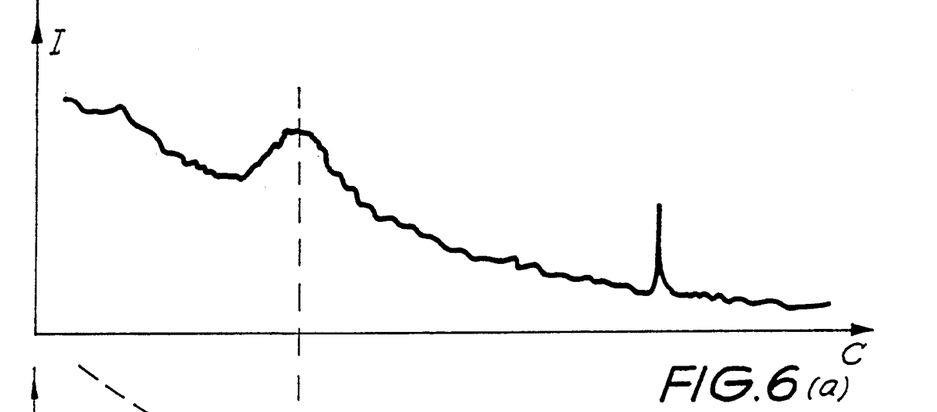
FIGS. 6(a)-6(c) are graphs illustrating typical signals from the analog processing section of FIG. 5 after various stages of processing.
Figure 6B:
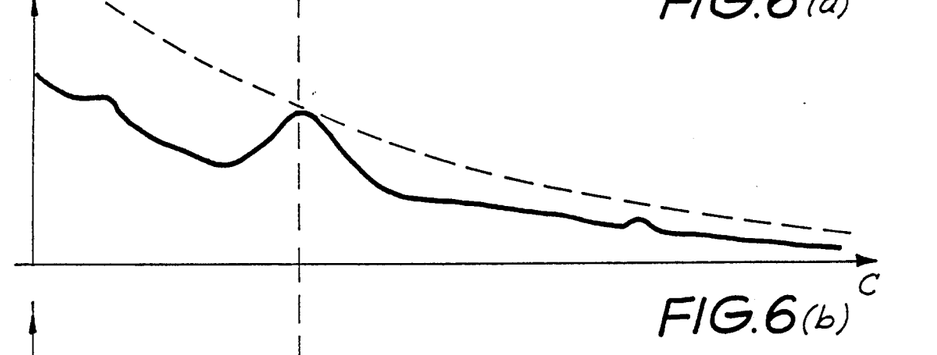

It will be recognized that the intensity of the reflected ray 21 will be inversely proportional to the distance of the point of reflection 18 from the point from which the ribbon beam 13 diverges (i.e. the lens 51) and reference to FIGS. 6a and 6b will indicate the typical form of a line signal from the camera 15, showing that the background level of reflected light diminishes with distance from the source and that peaks representing reflection from objects within the field of view must be compared with the background level expected for the particular value of the C co-ordinate.

Figure 4:
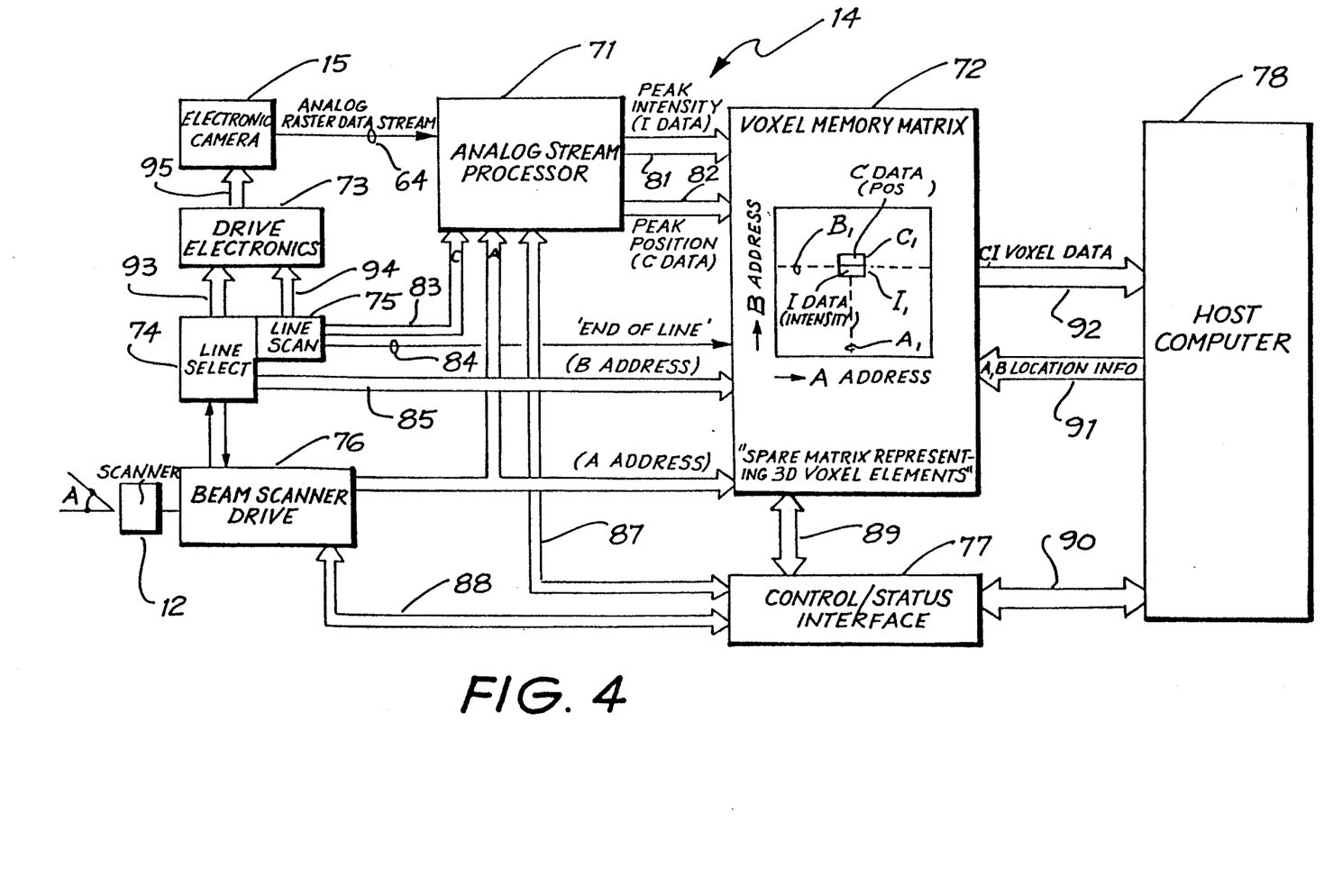
FIG. 4 is a circuit diagram which schematically illustrates the control unit used to control the embodiment of FIG. 3.

Referring now to FIG. 4, a control unit for controlling the apparatus of FIG. 3 is schematically illustrated. In this control unit, line select and line scan circuits 74 and 75 produce synchronizing signals 93 and 94 for the camera drive electronics 73 which in turn drive the camera 15 via control signals 95. Out of the camera 15 is produced an analog raster data signal 64 which is processed by an analog processing circuit 71 to produce a digital C co-ordinate 82 and intensity (or I) value 81 which are then stored in the voxel memory matrix 72 at locations addressed by the A and B co-ordinates derived from the projection angle and the respective raster line number, the B line address 85 being provided by the line select circuit 74 and the A address 80 being provided by the beam scanner drive circuit 76 which drives the mirror 53 of FIG. 3.

The line scan circuit 75 also generates a C co-ordinate characterising signal 83 which is supplied to the analog stream processor 71 to compensate the analog signal for reduction in intensity with illumination path length. The line scan circuit 75 also provides an end of line signal 84 which is used to load the C co-ordinate and intensity data into the voxel memory matrix.

Synchronization and control of access to the voxel memory matrix 72 is provided by a control/status interface 77 which also enables access to data in the voxel memory matrix by a host computer 78 via address lines 91, C and I data lines 92 and control lines 90.

Figure 5:
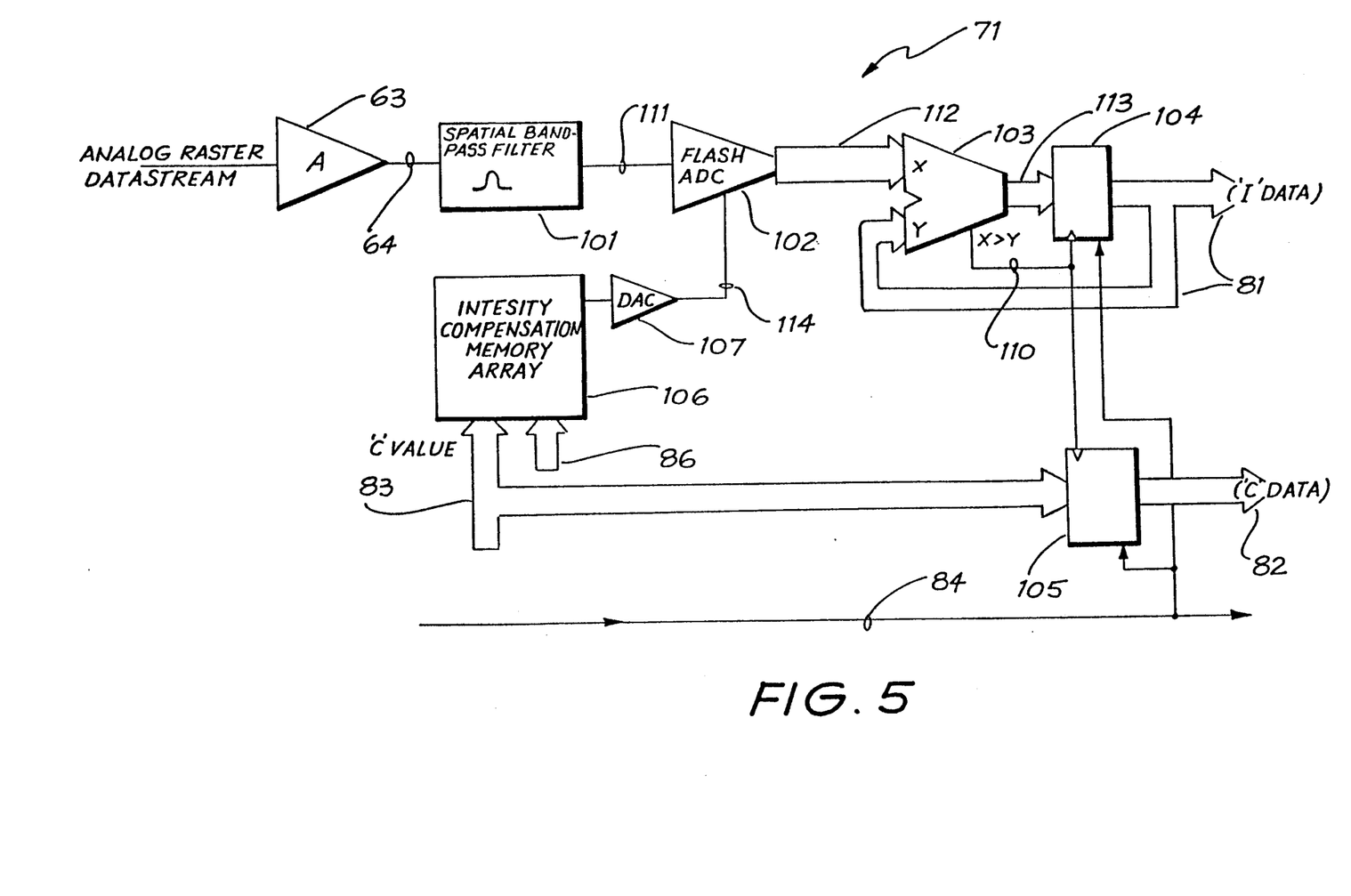
FIG. 5 is a circuit diagram which schematically illustrates the analog processing section of the control unit of FIG. 4 in greater detail.

Turning now to FIG. 5, the analog stream processor 71 of FIG. 4 is schematically illustrated in greater detail. In FIG. 5 the video raster scan analog signal 64 from the camera is first passed through a bandpass filter 101 having a frequency characteristic matched to the expected frequency characteristic of the raster scan signal for a point in the field of view illuminated by the ribbon beam 13. The effect of the bandpass filter 101 is to provide spatial filtering of the reflected light A1 from the field of view. The frequency characteristic of the filter 101 is derived by determining the intensity profile through the width of the projected beam 13, or alternatively by designing the projection optics to give a predetermined profile, and then calculating the fourier transform of a raster line signal generated when a projected line having this intensity profile is scanned across its width by a raster scan camera. The filter 101 is then designed to have a transfer function approximating the frequency domain function produced by the fourier transform.

The filtered video signal 111 from the bandpass filter 101 is then fed to a flash analog to digital converter (ADC) 102 to produce a digitally sampled video signal 112 which is fed to the X input of a digital comparator 103. While the flash ADC 102 is converting the video signal into a stream of digital samples, a compensation signal 114 is produced by a digital to analog converter (DAC) 107 from a memory array of holding a set of previously sampled reference intensity values which are fed to the DAC 107 in synchronism with the video signal supplied by the camera, the synchronization being provided by the C co-ordinate signal 83 produced by the line scan circuit 75 of FIG. 4 and the A co-ordinate value 86 produced by the beam scanner drive 76. The elevation angle B could also be fed as an additional address element to the intensity compensation array 106 (which would have to be larger) in which case the compensation function could be further refined.

The Y input of the digital comparator 103 is fed with the current I data signal 81 representing the current peak intensity signal for the present line of the image and this peak value is compared with the current intensity value 112. The comparator output 113 represents the greater of the two inputs and is fed to a latch 104, but is only latched into the latch 104 in those cases where the X input is greater than the Y input as indicated by the output signal 110. When the X input is the greater of the two then this value is latched into the latch 104 and becomes the new peak intensity (I) data signal 84 for the present line and at the same time the C co-ordinate value corresponding to the I sample latched into latch 104 is latched into the C co-ordinate latch 105.

At the end of each raster scan line, an end of line signal 84 causes the latched I and C values to be loaded into the voxel memory matrix 72 (refer to FIG. 4 at the appropriate locations selected by the A and B co-ordinates for the current beam projection angle A and raster scan line number B. At the same time the end of line signal 84 clears latches 104 and 105 in preparation for the commencement of scanning of a new line.

Referring to FIG. 6, the signal graphically represented in FIG. 6a is the analog output of the video camera for a given scan line and it will be noted that the intensity signal decreases as the camera scans points in the field of view which are further away from the source of illumination. It will also be noted that the peak value representing the point of illumination on this line may not have the highest intensity value on the line, and while not shown in this illustration it would also be possible for noise peaks to be greater than the wanted signal peak. Referring to FIG. 6b, the output 111 of the bandpass filter (solid line) illustrates the effect of the bandpass filter 101 on the video signal of FIG. 6a. In particular, it will be noted that the essential shape of the wanted peak has been retained, due to the matching of the frequency characteristics of the bandpass filter 101 to the intensity profile of the illuminating beam 13 with the effect that stray noise, caused for example by ambient light sources or dust particles in the field of view can be substantially attenuated.

Figure 6C:
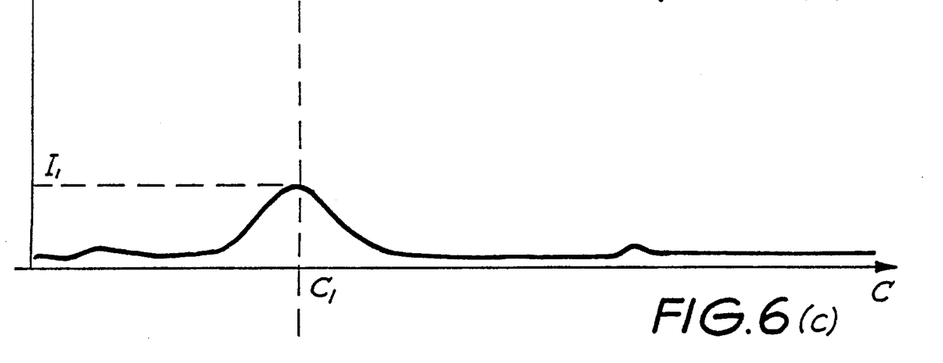

In FIG. 6b, the dashed line represents the inverse of the reference signal 114 generated by the compensation memory array 106 and the DAC 107. The filtered video signal 111 is multiplied by the reference signal 114 in the ADC 102 to produce the compensated video signal illustrated in 64c, and it is this signal which is sampled by the ADC 102 to produce the digitized video signal 112. It should be emphasized that the dashed line in FIG. 6b represents the inverse of the reference signal 114 and accordingly the compensation performed in the ADC 102 will have the effect of dividing the solid line signal of FIG. 6b by the dashed line signal.

I claim:

1. An optical imaging and location system comprising:

projection means situated at a first known location and arranged to project a beam of radiation into a field of view in a direction subtending a variable angle with a reference base line;

detection means spaced a predetermined distance from said projection means along said base line and including a lens and a detector array arranged so that a reflected ray of radiation from an object in said field of view is directed by said lens substantially onto one element of said detector array, said detector array having a first dimension the co-ordinate of which represents a value of an angle of incidence between said reflected ray in a horizontal reference plane and said base line, the value of said angle of incidence being determined by detecting the respective element in said first dimension of said detector array onto which a peak intensity point of said reflected ray is directed by said lens; and storage means for storing a spatial map of said field of view comprising a sparse array having one fewer dimension than said field of view, one dimension being addressed by a value representing said variable angle and, a plurality of cells, one of said cells being arranged to store the value of said angle of incidence.

2. The optical imaging and location system as claimed in claim 1, wherein said field of view is a three dimensional space and said sparse array is a two dimensional array one dimension of which is addressed by a value representing said variable angle and the other dimension of which is addressed by a line number corresponding to a line of elements in said first dimension of said detector array, said line number being representative of an elevation angle of said reflected ray subtended with said horizontal reference plane.

3. An optical imaging and location system comprising:

projection means situated at a first known location and arranged to project a beam of radiation into a field of view comprising a three dimensional space in a direction subtending a variable angle with a reference base line;

detection means spaced a predetermined distance from said projection means along said base line and including a lens and a detector array arranged so that a reflected ray of radiation from an object in said field of view is directed by said lens substantially onto one element of said detector array, said detector array having a first dimension the co-ordinate of which represents a value of an angle of incidence between said reflected ray in a horizontal reference plane and said base line, the value of said angle of incidence being determined by detecting the respective element in said first dimension of said detector array onto which a peak intensity point of said reflected ray is directed by said lens; and storage means for storing a spatial map of said field of view comprising a sparse array having one fewer dimension than said field of view, one dimension being addressed by a value representing said variable angle, and a plurality of cells, one of said cells being arranged to store the value of said angle of incidence;

said sparse array being a two dimensional array one dimension of which is addressed by a value representing said variable angle and the other dimension of which is addressed by a line number corresponding to a line of elements in said first dimension of said detector array, said line number being representative of an elevation angle of said reflected ray subtended with said horizontal reference plane;

said one cell of said sparse array storing a value representative of said angle of incidence corresponding to the position along said line of elements determined by locating the element onto which the peak intensity point of said reflected ray is directed by said lens in the plane defined by said line of elements and an intensity value of the reflected ray for which the angle of incidence is recorded.

* * * * *